(12) United States Patent
Hua et al.

(10) Patent No.: US 9,875,301 B2
(45) Date of Patent: Jan. 23, 2018

(54) LEARNING MULTIMEDIA SEMANTICS FROM LARGE-SCALE UNSTRUCTURED DATA

(71) Applicant: MICROSOFT TECHNOLOGY LICENSING, LLC, Redmond, WA (US)

(72) Inventors: Xian-Sheng Hua, Sammamish, WA (US); Jin Li, Bellevue, WA (US); Yoshitaka Ushiku, Kanagawa (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 562 days.

(21) Appl. No.: 14/266,228

(22) Filed: Apr. 30, 2014

(65) Prior Publication Data
US 2015/0317389 A1    Nov. 5, 2015

(51) Int. Cl.
*G06N 99/00* (2010.01)
*G06F 17/30* (2006.01)

(52) U.S. Cl.
CPC .. *G06F 17/30705* (2013.01); *G06F 17/30675* (2013.01); *G06F 17/30864* (2013.01); *G06N 99/005* (2013.01)

(58) Field of Classification Search
CPC .............................. G06N 99/00; G06N 99/005
See application file for complete search history.

(56) References Cited

U.S. PATENT DOCUMENTS

| 6,327,581 | B1 | 12/2001 | Platt |
| 6,762,769 | B2 | 7/2004 | Guo et al. |
| 6,915,025 | B2 | 7/2005 | Wang et al. |
| 7,124,149 | B2 | 10/2006 | Smith et al. |
| 7,164,798 | B2 | 1/2007 | Hua et al. |
| 7,386,527 | B2 | 6/2008 | Harris et al. |

(Continued)

FOREIGN PATENT DOCUMENTS

| CN | 103246893 | 8/2013 |
| WO | WO2014009490(A1) | 1/2014 |

OTHER PUBLICATIONS

B. Larsen and C. Aone, "Fast and Effective Text Mining Using Linear-time Document Clustering", KDD-99, 2009, pp. 16-23.*

(Continued)

*Primary Examiner* — Vincent Gonzales
(74) *Attorney, Agent, or Firm* — Schwegman Lundberg & Woessner, P.A.

(57) ABSTRACT

Systems and methods for learning topic models from unstructured data and applying the learned topic models to recognize semantics for new data items are described herein. In at least one embodiment, a corpus of multimedia data items associated with a set of labels may be processed to generate a refined corpus of multimedia data items associated with the set of labels. Such processing may include arranging the multimedia data items in clusters based on similarities of extracted multimedia features and generating intra-cluster and inter-cluster features. The intra-cluster and the inter-cluster features may be used for removing multimedia data items from the corpus to generate the refined corpus. The refined corpus may be used for training topic models for identifying labels. The resulting models may be stored and subsequently used for identifying semantics of a multimedia data item input by a user.

20 Claims, 8 Drawing Sheets

(56) References Cited

U.S. PATENT DOCUMENTS

| | | | |
|---|---|---|---|
| 7,558,764 | B2 | 7/2009 | Abe et al. |
| 7,873,583 | B2 | 1/2011 | Laxman et al. |
| 7,983,486 | B2 | 7/2011 | Zhou |
| 8,086,549 | B2 | 12/2011 | Qi et al. |
| 8,140,450 | B2 | 3/2012 | Porikli et al. |
| 8,386,574 | B2 | 2/2013 | Chidlovskii et al. |
| 8,509,478 | B2 | 8/2013 | Haas et al. |
| 8,605,956 | B2 | 12/2013 | Ross et al. |
| 8,645,380 | B2 | 2/2014 | Wang et al. |
| 8,781,978 | B2 | 7/2014 | Milenova |
| 8,805,067 | B2 | 8/2014 | Lee et al. |
| 2009/0290802 | A1 | 11/2009 | Hua et al. |
| 2012/0254191 | A1 | 10/2012 | Sanyal et al. |
| 2012/0263388 | A1 | 10/2012 | Vaddadi et al. |
| 2014/0140610 | A1 | 5/2014 | Tu et al. |
| 2014/0241623 | A1 | 8/2014 | Wang et al. |
| 2014/0270350 | A1 | 9/2014 | Rodriguez-Serrano et al. |
| 2014/0270495 | A1 | 9/2014 | Tu et al. |
| 2015/0380009 | A1* | 12/2015 | Chang .................... G10L 15/24 704/263 |
| 2016/0140451 | A1 | 5/2016 | Li et al. |

OTHER PUBLICATIONS

V. Hautamaki et al., "Improving K-Means by Outlier Removal", SCIA 2005, pp. 978-987.*

Z. Xu et al., "Towards the Semantic Web: Collaborative Tag Suggestions", Collaborative web tagging workshop at WWW2006, 8 pages.*

JR Wen et wl., "Clustering User Queries of a Search Engine", ACM Proc. 10th Int'l Conf. on WWW, 2001, pp. 162-168.*

F. Moosmann et al., "Randomized Clustering Forests for Image Classification", IEEE Trans. on Pattern Anal. and Mach. Intel., vol. 30, No. 9, Sep. 2008, pp. 1632-1646.*

L. Rokach and O. Maimon, Clustering Methods, in Data Mining and Knowledge Discovery Handbook, Springer US, 2005, pp. 321-352.*

"Second Written Opinion Issued in PCT Application No. PCT/US2015/027408", dated Mar. 11, 2016, 7 Pages.

Abe, et al., "An Iterative Method for Multi-class Cost-sensitive Learning", In Proceedings of the Tenth ACM SIGKDD International Conference on Knowledge Discovery and Data Mining, Aug. 22, 2004, 9 pages.

Antic, et al., "Learning Latent Constituents for Recognition of Group Activities in Video", In Proceedings of the European Conference on computer Vision, Sep. 6, 2014, 15 pages.

Brown, et al., "Multi-Image Matching using Multi-Scale Oriented Patches", "In Proceedings of the IEEE Computer Society Conference on Computer Vision and Pattern Recognition", Jun. 20, 2005, 8 pages.

Chen, et al., "NEIL: Extracting Visual Knowledge from Web Data", In IEEE International Conference on Computer Vision, Dec. 1, 2013, 8 pages.

Cheng, et al., "BING: Binarized Normed Gradients for Objectness Estimation at 300fps", In Proceedings of Computer Vision and Pattern Recognition, Jun. 24, 2014, 8 pages.

Divvala, et al., "Learning Everything About Anything: Webly Supervised Visual Concept Learning", In IEEE Conference on Computer Vision and Pattern Recognition, Jun. 23, 2014, 8 pages.

Jain, et al., "Active Learning for Large Multi-class Problems", In IEEE Conference on Computer Vision and Pattern Recognition, Jun. 20, 2009, 8 pages.

Jain, et al., "Fast Image Search for Learned Metrics", In Proceedings of IEEE Conference on Computer Vision and Pattern Recognition, Jun. 28, 2008, 8 pages.

Jain, et al., "Multi-Class Open Set Recognition Using Probability of Inclusion", In European Conference on Computer Vision, Sep. 6, 2014, 17 pages.

Juneja, et al., "Blocks that Shout: Distinctive Parts for Scene Classification", In IEEE Conference on Computer Vision and Pattern Recognition, Jun. 23, 2013, 8 pages.

Lei, et al., "Half-Against-Half Multi-class Support Vector Machines", In Proceedings of the 6th international conference Multiple Classifier Systems, Jun. 13, 2005, 2 pages, Abstract only.

Li, et al., "Harvesting Mid-level Visual Concepts from Large-scale Internet Images", In Proceedings of IEEE Conference on Computer Vision and Pattern Recognition, Jun. 25, 2013, 8 pages.

Misra, et al., "Data-driven Exemplar Model Selection", In Proceedings of IEEE Winter Conference on Applications of Computer Vision, Mar. 24, 2014, 8 pages.

Singh, et al., "Unsupervised Discovery of Mid-level Discriminative Patches", In Proceedings of the 12th European Conference on Computer Vision, Oct. 7, 2014, 14 pages.

U.S. Appl. No. 14/266,228, Hua, et al., "Learning Multimedia Semantics from Large-Scale Unstructured Data", filed Apr. 30, 2014.

U.S. Appl. No. 14/266,228, Ushiku, et al., "Learning Multimedia Semantics from Large-Scale Unstructured Data", filed Apr. 30, 2014.

Yao, et al., "Strokelets a Learned Multi-Scale Representation for Scene Text Recognition", In Proceedings of IEEE Conference on Computer Vision and Pattern Recognition, Jun. 23, 2014, 8 pages.

Bins, et al., "Feature Selection from Huge Feature Sets", In Proceedings of Eighth IEEE International Conference on Computer Vision, vol. 2, Jul. 7, 2001, 7 pages.

Cohen, et al., "Redundancy-Aware Topic Modeling for Patient Record Notes", PLOS One, vol. 9, No. 2, Feb. 13, 2014, 7 Pages.

"International Search Report & Written Opinion Received for PCT Application No. PCT/US2015/027408", dated Sep. 8, 2015, 11 Pages.

Li, et al., "Pachinko Allocation DAGStructured Mixture Models of Topic Correlations", In Proceedings of the 23rd international conference on Machine learning, Jun. 25, 2006, 8 pages.

Qiu, et al., "Objects Over the World", In Advances in Multimedia Information Processing—PCM 2008, Lecture Notes in Computer Science, Series vol. 5353, Dec. 9, 2008, 10 pages.

Sristy, et al., "Paired Feature Constraints for Latent Dirichlet Topic Models", In Proceedings of International Conference of Soft Computing and Pattern Recognition, Dec. 15, 2013, 6 pages.

Liu, et al., "Gathering Training Sample Automatically for Social Event Visual Modeling", In Proceedings of International Workshop on Socially-Aware Multimedia, Oct. 29, 2012, pp. 9-14.

Manzato, et al., "Automatic Annotation of Tagged Content Using Predefined Semantic Concepts", In Proceedings of 18th Brazilian symposium on Multimedia and the Web, Oct. 15, 2012, pp. 237-244.

Setz, et al., "Can Social Tagged Images Aid Concept-Based Video Search?", In IEEE International Conference on Multimedia and Expo, Jun. 28, 2009, pp. 1460-1463.

Ulges, et al., "Learning Visual Contexts for Image Annotation from Flickr Groups", In IEEE Transactions on Multimedia, vol. 13, Issue 2, Apr. 2011, pp. 330-341.

Zhang, et al., "Active Learning through Notes Data in Flickr", In Proceedings of 1st ACM International Conference on Multimedia Retrieval, Apr. 17, 2011, 8 pages.

Zhu, et al., "On the Sampling of Web Images for Learning Visual Concept Classifiers" In Proceedings of the ACM International Conference on Image and Video Retrieval, Jul. 5, 2010, pp. 50-57.

Chen, et al., "Action recognition through discovering distinctive action parts", Journal of the Optical Society of America A, vol. 32, No. 2, Jan. 8, 2015, pp. 173-185, 13 pages.

Chen, et al, "Learning a Compact Latent Representation of the Bag-of-Parts Model", 2014 IEEE International Conference on Image Processing (ICIP 2014): Paris, France, Oct. 27-30, Oct. 1, 2014, pp. 5926-5930, 5 pages.

Ciaramita, et al., "Supersense Tagging of Unknown Nouns in WordNer", In Proceedings of the 2003 Conference on Empirical Methods in Natural Language Processing, Jul. 11, 2003, pp. 168-175. 8 pages.

(56) References Cited

OTHER PUBLICATIONS

Crammer, et al., "Ultraconservative Online Algorithms for Multiclass Problems", In Proceedings of 14th Annual Conference on Computational Learning Theory, Jul. 16, 2001, pp. 99-115. 17 pages.
Hariharan, et al., "Discriminative Decorrelation for Clustering and Classification", Computer Vision ECCV, Octover 7, 2012, pp. 459-472, 14 pages.
"International Search Report and Written Opinion for PCT/US2015/067554", dated Mar. 24, 2016, 16 pages.
"International Search Report and Written Opinion Issued in PCT Application No. PCT/US2016/013497", dated Apr. 21, 2016, 14 pages.
Jumutc, et al., "Multi-Class Supervised Novelty Detection", In Proceedings of IEEE Transactions on Pattern Analysis and Machine Intelligence, vol. 36, Issue 12, Jun. 3, 2014, pp. 2510-2523. 14 pages.
The PCT International Preliminary Report on Patentability dated Jul. 26, 2016 for PCT application No. PCT/US2015/027408, 20 pages.
Sicre, et al., "Discovering and Aligning Discriminative Mid-level Features for Image Classification", International Conference on Pattern Recognition, IEEE Computer Society, US, Aug. 24, 2014, pp. 1975-1980, 6 pages.
Office Action for U.S. Appl. No. 14/602,524, dated Dec. 16, 2016, Hua et al., "Optimizing Multi-Class Multimedia Data Classification Using Negative Data", 6 pages.

\* cited by examiner

LEARNING MULTIMEDIA SEMANTICS FROM LARGE-SCALE UNSTRUCTURED DATA

BACKGROUND

Most computer operations involve two types of data: structured data and unstructured data. Structured data has a high degree of organization, making inclusion in a relational database smooth and easily searchable by simple search engine algorithms. For example, spreadsheets include structured data because the data resides in fixed fields within a spreadsheet file providing quick and easy access to the information in the fixed fields. On the other hand, unstructured data includes text and multimedia content having internal structure, but lacking the ability to fit neatly in relational databases. Examples of unstructured data include emails, word processing documents, videos, photos, audio files, presentations, webpages, microblogs, x-rays, etc.

Current data-mining techniques require substantial investments of resources to analyze and extract meaningful data elements from unstructured data. For example, present data-mining techniques for mining semantics from unstructured multimedia data depend on available labeled training data. Labeled training data includes user generated tags, classes, and/or metadata that provide information relevant to unstructured multimedia data. Some semantic mining approaches identify semantics based on the tags, classes, and/or metadata associated with unstructured multimedia data. Other semantic mining approaches use notes associated with unstructured multimedia data to glean a meaning from the unstructured multimedia data or identify semantics by using cluster information and/or a context of the unstructured multimedia data. Recently, click logs from search engines have been used to provide efficient ways to generate training data for identifying semantics associated with unstructured multimedia data.

SUMMARY

This disclosure describes systems and methods for learning topic models from unstructured data available on the Internet and applying the learned models to recognize semantics for new data items. In at least one embodiment, a corpus of multimedia data items, in which each data item is associated with a label of a set of labels, may be received. The corpus of multimedia data items may be processed to generate a refined corpus of multimedia data items associated with the set of labels. Such processing may include arranging the multimedia data items in clusters based on similarities of extracted multimedia features and generating relevance features. In at least one embodiment, intra-cluster features and inter-cluster features may be used. The intra-cluster features may represent distribution characteristics of pair-wise distances between pairs of multimedia data items in a cluster. The inter-cluster features may represent distribution characteristics of distances between a cluster of multimedia data items associated with a label and other clusters of multimedia data items associated with other labels. The intra-cluster features and the inter-cluster features may be used in removing multimedia data items from the corpus to generate the refined corpus. The refined corpus may be used for training models for identifying a label.

In at least one embodiment, the systems and methods may be configured to identify semantics of a multimedia data item. A user may input a multimedia data item into the system described herein and specify a topic associated with the multimedia data item. The system may apply one or more models to determine a label associated with the input multimedia data item and may output a result to the user. The result output to the user may include labels determined by applying the models to identify the semantics of the multimedia data item.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
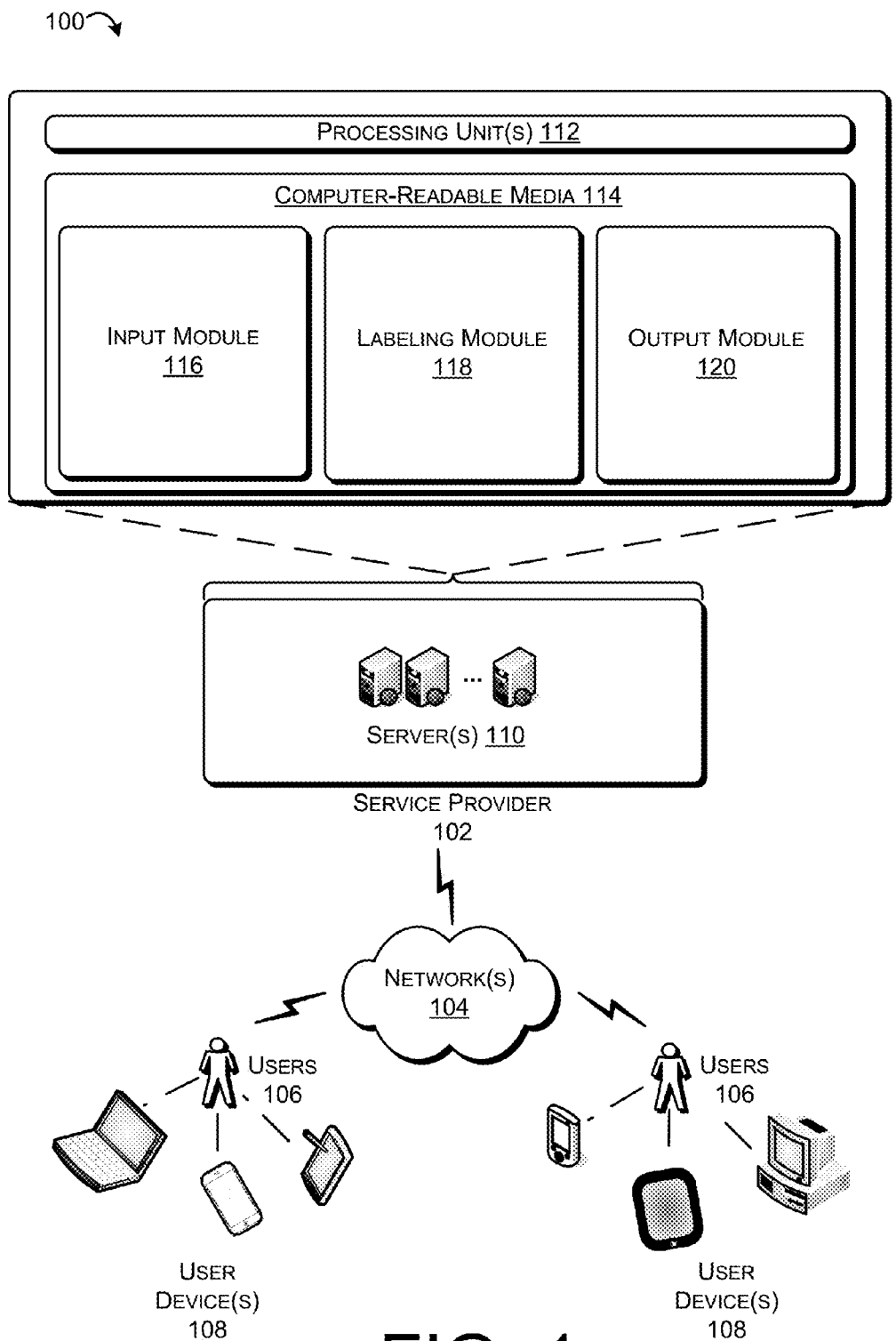
FIG. 1 is a diagram showing an example system for learning topic models from unstructured data and applying the learned topic models to recognize semantics for new data items.

Recognizing a meaning (e.g., what, who, where, etc.) associated with a multimedia data item (e.g., photo, video, speech, music, etc.) may be useful for several applications including photo and/or video identification, annotation, search, etc. However, current data-mining techniques require substantial investments of resources to analyze and extract meaningful data elements from unstructured data. For example, present data-mining techniques for mining semantics from unstructured multimedia data depend on available labeled training data such as user generated tags, classes, and/or metadata that provide information relevant to unstructured multimedia data. Other semantic mining approaches use notes associated with unstructured multimedia data to glean a meaning from the unstructured multimedia data. Current data-mining techniques lack scalability and extendibility. In this disclosure, systems and methods for learning topic models from unstructured data available on the Internet are disclosed. Additionally, systems and methods for applying the learned topic models to recognize semantics for new data items are disclosed herein.

The systems and methods described herein may be useful for identifying a meaning associated with a multimedia data item. Such semantic identification may be leveraged for several applications including photo and/or video identification, annotation, search, etc. For example, museums, zoos, and/or other attractions may apply the semantic identification techniques described herein for self-guided tours through or annotations relevant to the attractions. In such an embodiment, a user may take a photo or video of a subject of an exhibit (e.g., Leonardo da Vinci's Mona Lisa) and the systems and methods described herein may identify the painting for the user. Semantic identification may be leveraged for other applications as well.

In at least some embodiments, a corpus of multimedia data items associated with a set of labels may be received. Each multimedia data item in the corpus of multimedia data items may be associated with at least one label in the set of labels. The corpus of multimedia data items may be processed to generate a refined corpus of multimedia data items associated with the set of labels. Such processing may include arranging the multimedia data items in clusters based on extracted multimedia features and generating relevance features. In at least one embodiment, the relevance features include intra-cluster features and inter-cluster features. The intra-cluster features may represent distribution characteristics of pair-wise distances between pairs of multimedia data items in a cluster. The inter-cluster features may represent distribution characteristics of distances between individual clusters of multimedia data items associated with a label and other clusters associated with other labels. The intra-cluster features and the inter-cluster features may be used for removing multimedia data items from the corpus to generate the refined corpus. The refined corpus may be used for training a topic model.

In at least one embodiment, a user may input an multimedia data item into the learned system described herein. The user may also specify a topic associated with the multimedia data item. The system may apply one or more models associated with the topic to determine a label associated with the input multimedia data item. Additionally, the system may output a result to the user. The result may include labels determined by applying the one or more models to identify the semantics of the multimedia data item.

Unstructured data may include unstructured multimedia data. In some embodiments, unstructured multimedia data may include text-based documents such as emails, word processing documents, etc. In additional embodiments, unstructured multimedia data may include still images (e.g., photos), videos, animations, etc. In other embodiments, unstructured multimedia data may also include audio or speech files. Unstructured multimedia data may include a combination of text, visual, and/or audio data in presentations, webpages, microblogs, etc.

The unstructured multimedia data may be available on the Internet. For example, for any query associated with a label, unstructured multimedia data may be extracted from data available on the Internet in search engines, social-networking services, blogging services, data sources, and/or other websites or web services. Examples of search engines include Bing®, Google®, Yahoo! Search®, Ask®, etc. Examples of social-networking services include Facebook®, Twitter®, Instagram®, MySpace®, Flickr®, YouTube®, etc. Examples of blogging services include WordPress®, Blogger®, Squarespace®, Windows Live Spaces®, WeiBo® etc. Examples of data sources include ImageNet (maintained by Stanford University), open video annotation project (maintained by Harvard University), etc.

In some embodiments, the unstructured multimedia data may be accessible by the public (e.g., data stored in search engines, public Twitter® pictures, public Facebook® pictures, etc.). However, in other embodiments, the unstructured multimedia data may be private (e.g., private Facebook® pictures, private YouTube® videos, etc.) and may not be viewed by the public. In such embodiments (i.e., when the unstructured multimedia data is private), the systems and methods described herein may not proceed without first obtaining permission from the authors of the unstructured multimedia data to access the unstructured multimedia data.

In the embodiments where the unstructured multimedia data is private or includes personally identifiable information (PII) that identifies or can be used to identify, contact, or locate a person to whom such data pertains, a user may be provided with notice that the systems and methods herein are collecting PII. Additionally, prior to initiating PII data collection, users may have an opportunity to opt-in or opt-out of the PII data collection. For example, a user may opt-in to the PII data collection by taking affirmative action indicating that he or she consents to the PII data collection. Alternatively, a user may be presented with an option to opt-out of the PII data collection. An opt-out option may require an affirmative action to opt-out of the PII data collection, and in the absence of affirmative user action to opt-out, PII data collection may be impliedly permitted.

The topics described herein may be general concepts that are hierarchically related to the labels described herein. In at least one embodiment, a set of labels comprises a topic. For example, a topic may be a general concept or category such as "Seattle Attractions," "Animals," "Sea Life of Hawaii," etc.

Labels may represent sub-topics, sub-concepts, or sub-categories of the topics. That is, labels correspond to one particular entity (e.g., animal, plant, attraction, etc.). Labels may also be called entities. Labels may be more specific than topics. Examples of labels that may be associated with the topic "Seattle Attractions" include "Space Needle," "Seattle Great Wheel," "Woodland Park Zoo," "Experience Music Project Museum," etc. Examples of labels that may be associated with the topic "Animals" may include "giraffe," "lion," "monkey," "tiger," etc.

Queries are textual terms or phrases that may be used to collect the corpus of multimedia data items from search engines, social networks, etc. Typically, a label corresponds to a particular query, but in some embodiments, a label may correspond to more than one query. For example, in such embodiments, the label "orca whale" may correspond to queries such as "orca whale," "killer whale" and/or "blackfish."

Embodiments described herein provide systems and methods for learning semantics from unstructured data and applying the learned models to recognize semantics for new data items. In various instances, a processing unit configured via programming from modules or APIs to perform techniques as described herein can include one or more of a central processing unit (CPU), a graphics processing unit (GPU), a field-programmable gate array (FPGA), another class of digital signal processor (DSP), or other hardware logic components that may, in some instances, be driven by the CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Illustrative Environment

The environment described below constitutes but one example and is not intended to limit application of the system described below to any one particular operating environment. Other environments may be used without departing from the spirit and scope of the claimed subject matter. The various types of processing described herein may be implemented in any number of environments including, but not limited to, stand along computing systems, network environments (e.g., local area networks or wide area networks), peer-to-peer network environments, distributed-computing (e.g., cloud-computing) environments, etc.

FIG. 1 illustrates an example operating environment 100 that includes a variety of devices and components that may be implemented in a variety of environments for learning topic models from unstructured data and applying the learned topic models to recognize semantics for new data items. More particularly, the example operating environment 100 may include a service provider 102, one or more network(s) 104, one or more users 106, and one or more user devices 108 associated with the one or more users 106. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

As shown, the service provider 102 may include one or more server(s) 110, which may include one or more processing unit(s) 112 and computer-readable media 114. In various embodiments, the service provider 102 may learn semantics from unstructured data. The service provider 102 may receive a corpus of multimedia data items associated with a set of labels and may extract multimedia features from the multimedia data items. The service provider 102 may refine the corpus of multimedia data items and may train models based on the refined corpus of multimedia data items. The service provider 102 may leverage the learned topic models to recognize semantics for new data items input by users 106.

In some embodiments, the network(s) 104 may be any type of network known in the art, such as the Internet. Moreover, the users 106 may communicatively couple to the network(s) 104 in any manner, such as by a global or local wired or wireless connection (e.g., local area network (LAN), intranet, etc.). The network(s) 104 may facilitate communication between the server(s) 110 and the user devices 108 associated with the users 106.

In some embodiments, the users 106 may operate corresponding user devices 108 to perform various functions associated with the user devices 108, which may include one or more processing unit(s), computer-readable storage media, and a display. Furthermore, the users 106 may utilize the user devices 108 to communicate with other users 106 via the one or more network(s) 104.

User device(s) 108 can represent a diverse variety of device types and are not limited to any particular type of device. Examples of device(s) 108 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, personal data assistants (PDAs), portable gaming devices, media players, cameras, or the like. Example embedded computers can include network enabled televisions, integrated components for inclusion in a computing device, appliances, microcontrollers, digital signal processors, or any other sort of processing device, or the like.

The service provider 102 may be any entity, server(s), platform, etc., that may learn topic models from unstructured data and apply the learned topic models to recognize semantics for new data items. Moreover, and as shown, the service provider 102 may include one or more server(s) 110, which may include one or more processing unit(s) 112 and computer-readable media 114 such as memory. The one or more server(s) 110 may include devices.

Embodiments support scenarios where device(s) that may be included in the one or more server(s) 110 can include one or more computing devices that operate in a cluster or other clustered configuration to share resources, balance load, increase performance, provide fail-over support or redundancy, or for other purposes. Device(s) included in the one or more server(s) 110 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) that may be included in the one or more server(s) 110 can include any type of computing device having one or more processing unit(s) 112 operably connected to computer-readable media 114 such as via a bus, which in some instances can include one or more of a system bus, a data bus, an address bus, a PCI bus, a Mini-PCI bus, and any variety of local, peripheral, and/or independent buses. Executable instructions stored on computer-readable media 114 can include, for example, an input module 116, a learning module 118, and an output module 120, and other modules, programs, or applications that are loadable and executable by processing units(s) 112. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZyXEL® or Altera® that includes a CPU course embedded in an FPGA fabric.

Device(s) that may be included in the one or more server(s) 110 can further include one or more input/output (I/O) interface(s) coupled to the bus to allow device(s) to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Devices that may be included in the one or more server(s) 110 can also include one or more network interfaces coupled to the bus to enable communications between computing device and other networked devices such as user device(s) 108. Such network interface(s) can include one or more network interface controllers (NICs) or other types of transceiver devices to send and receive communications over a network. For simplicity, some components are omitted from the illustrated system.

Processing unit(s) 112 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various embodiments, the processing unit(s) 112 may execute one or more modules and/or processes to cause the server(s) 110 to perform a variety of functions, as set forth above and explained in further detail in the following disclosure. Additionally, each of the processing unit(s) 112 may possess its own local memory, which also may store program modules, program data, and/or one or more operating systems.

In at least one configuration, the computer-readable media 114 of the server(s) 110 may include components that facilitate interaction between the service provider 102 and the users 106. For example, the computer-readable media 114 may include the input module 116, the labeling module 118, and the output module 120. The modules (116, 118, and 120) can be implemented as computer-readable instructions, various data structures, and so forth via at least one processing unit(s) 112 to configure a device to execute instructions and to perform operations implementing. Functionality to perform these operations may be included in multiple devices or a single device.

Depending on the exact configuration and type of the server(s) 110, the computer-readable media 114 may include computer storage media and/or communication media. Computer storage media can include volatile memory, non-volatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media may embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communications media consisting solely of a modulated data signal, a carrier wave, or a propagated signal, per se.

Learning Multimedia Semantics

Figure 2:
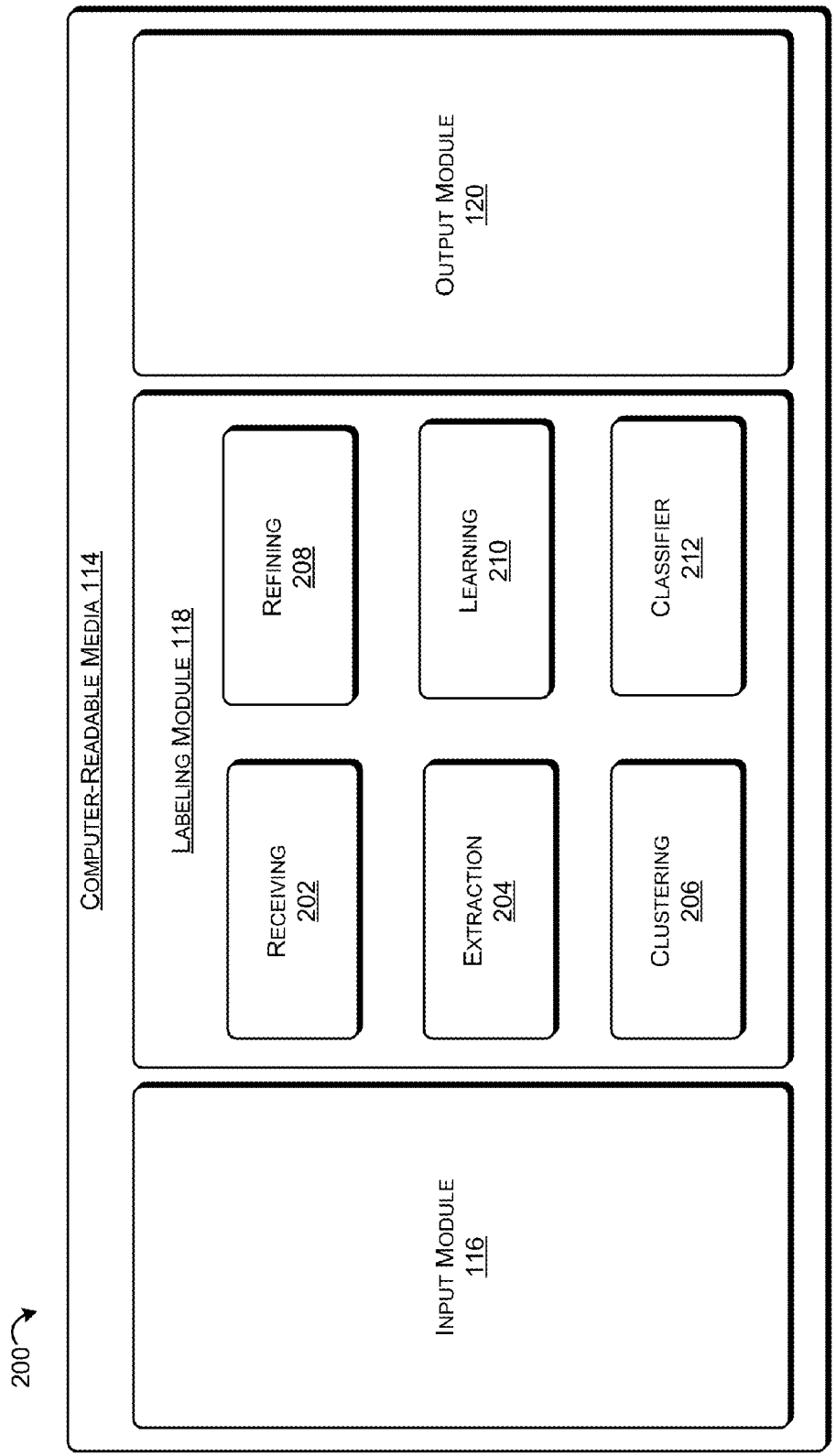
FIG. 2 is a diagram showing additional components of the example system for learning topic models from unstructured data and applying the learned topic models to recognize semantics for new data items.

FIG. 2 is a diagram showing additional components of the example system 200 for learning topic models from unstructured data and applying learned topic models to recognize semantics for new data items. As shown in FIGS. 1 and 2, the system 200 may include the input module 116, the labeling module 118, and the output module 120.

The input module 116 may be configured to receive one or more inputs from one or more users 106. The users 106 may input one or more multimedia data items into the input module 116 via one of the user devices 108. For example, in at least one embodiment, a user 106 may select an multimedia data item stored on his or her user device 108 for input into the input module 116. In another embodiment, a user 106 may take a photo or video via his or her user device 108 and input the multimedia data item into the input module 116.

In addition to receiving multimedia data items as input, the input module 116 may receive input from the one or more users 106 indicating a topic associated with the multimedia data item. For example, in at least one embodiment, a user 106 may take a photo of the Space Needle in Seattle, Wash. using his or her user device 108. The user 106 may input the photo into the input module 116. Additionally, the user 106 may input "Seattle Attractions" as a topic associated with the multimedia data item. As an additional example, a user 106 may select a photo of a Pink Tail Triggerfish. Accordingly, the photo of the Pink Tail Triggerfish may be input into the input module 116. Additionally, the user 106 may input "Sea Life of Hawaii" as a topic associated with the multimedia data item.

The labeling module 118 may be configured to learn topic models from unstructured data and apply the learned topic models to recognize semantics for new data items input into the input module 116. The labeling module 118 may include additional components or modules for learning semantics from the unstructured data. In at least one embodiment, the labeling module 118 may include a receiving component 202, an extraction component 204, a clustering component 206, a refining component 208, a learning component 210, and a classifier component 212.

The receiving component 202 may be configured to receive a corpus of multimedia data items associated with a set of labels associated with a topic. In at least one embodiment, the receiving component 202 may receive one or more labels each representing a semantic meaning associated with a multimedia data item. The receiving component 202 may generate one or more queries corresponding to a particular label of the one or more labels. The one or more queries may be textual queries, multimedia data item queries, etc. For example, the one or more queries may include words used to identify a label (e.g., "orca whale") and related words and/or phrases (e.g., "killer whale," "blackfish," etc.). In at least one embodiment, a user may include optional modifiers to the one or more queries. For example, if a user wishes to use Jaguar as a query, a user may modify the query "jaguar" to include "animal." In such embodiments, the resulting corpus of multimedia data items may include jaguar animals but may exclude Jaguar® cars. The receiving component 202 may send the one or more queries to one or more search engines, social-networking services, blogging services, and/or other websites or web services as described above.

Multimedia data items relating to the one or more queries may be returned to the receiving component 202 from the one or more search engines, social-networking services, blogging services, and/or other websites or web services. In at least some embodiments, multimedia data items that have been viewed by users 106 following a same or related query (e.g., multimedia data items from a search engine's click log) may also be returned to the receiving component 202. In some embodiments, metadata associated with the multimedia data items may also be returned. For instance, if a query is "orca whale" as described above, multimedia data items associated with "orca whale" may be returned to the receiving component 202. The returned multimedia data items may comprise a corpus of multimedia data items associated with the topic. Additional queries associated individual labels of a set of labels may be sent to the one or more search engines, social-networking services, blogging services, and/or other websites or web services as described above, and corresponding multimedia data items may be returned and added to the corpus of multimedia data items associated with the topic. In some embodiments, the corpus may be noisy and may include multimedia data items that are unrelated to the one or more queries, are of low quality, etc.

In at least some embodiments, the receiving component 202 may receive a topic query identifying a topic before receiving the set of labels associated with the topic. The topic query may be sent to one or more search engines, sharing sites, and/or websites as described above. Responsive to sending the topic query, the receiving component 202 may receive the set of labels associated with the topic. Then, the receiving component 202 may use the set of labels associated with the topic as queries for collecting the corpus of multimedia data items associated with the set of labels as described above.

For example, a user 106 may be interested in learning topic models for attractions in Seattle, Wash. A user 106 may send a topic query of "Seattle Attractions" to one or more search engines, sharing sites, database, and/or websites as described above. Responsive to sending the topic query, one or more labels including "Space Needle," "Woodland Park Zoo," "Seattle Great Wheel," "Seattle Aquarium," "Experience Music Project," "Safeco Field," etc., may be returned. Then, the receiving component 202 may use individual labels of the returned set of labels (e.g., "Seattle Great Wheel") to collect multimedia data items associated with the "Seattle Great Wheel" for learning topic models associated with the "Seattle Great Wheel." Additionally, the receiving component 202 may use each of the individual labels of the returned set of labels to generate the corpus of multimedia data items associated with the topic, "Seattle Attractions."

As described above, the corpus of multimedia data items may be noisy and may include multimedia data items that are unrelated to the labels and/or topic, are of low quality, etc. Accordingly, the corpus of multimedia data items may need to be refined to remove multimedia data items that are unrelated to the labels and/or topic, are of low quality, etc. The extraction component 204, clustering component 206, and refining component 208 may be configured to process the corpus to generate a refined corpus of multimedia data items that are more relevant to the labels and/or topic and are of a higher quality than the multimedia data items in the pre-processed corpus.

In at least one embodiment, the extraction component 204 may be configured for extracting multimedia features from the multimedia data items. Multimedia features may include visual features, textual features, motion features, spectrum features, etc. The multimedia features allow a general neighborhood operation to measure similarity between two multimedia data items in the contextual space. Visual features may range from simple visual features, such as edges and/or corners, to more complex visual features, such as objects. Textual features include tags, classes, and/or metadata associated with the multimedia data items. For video, motion features can be further generated to describe the movement of the object in the video. For audio, speech, and/or music, spectrum features can be generated.

Multimedia feature extraction may describe the process of identifying interesting portions or shapes of multimedia data items and extracting those features for additional processing. The process of identifying interesting portions or shapes of multimedia data items may be called feature extraction and such feature extraction may occur via common multimedia feature extraction technique such as SIFT (scale-invariant feature transform) or deep neural networks (DNN) feature extractor, etc. In at least one embodiment, multimedia feature extraction may describe turning a piece of multimedia data (image, video, audio/speech/music) into a high dimensional feature vector. For example, all information provided may be organized as a single vector, which is commonly referred to as a feature vector. In at least one embodiment, each multimedia data item in the corpus of multimedia data items may have a corresponding feature vector based on a suitable set of multimedia features. Then, based on the individual feature vectors, multimedia data items may be clustered into groups and a standard classification method can be used for learning to identify labels in the learning component 210.

The clustering component 206 may be configured for arranging the multimedia data items in clusters based on similarities between features of the extracted feature vectors. The clustering component 206 may use different methods of vector quantization including K-Means clustering to arrange the clusters of multimedia data items. In at least one embodiment, the clusters of multimedia data items are processed to derive sets of relevance features for each cluster to differentiate relevant clusters having high quality multimedia data items from clusters that are irrelevant and/or have low quality multimedia data items. The sets of relevance features include intra-cluster features and inter-cluster features.

The intra-cluster features represent relevance features of a cluster based on distance distribution characteristics of pairs of multimedia data items within a cluster of multimedia data items associated with a label. Examples of cluster characteristics include consistency between the multimedia data items in the cluster, quality of the multimedia data items in the cluster, etc. The intra-cluster features may be determined by calculating pair-wise distances for multimedia data item pairs in the cluster. For example, if a particular cluster has n multimedia data items, then the total number of distances applicable to the cluster is $n*(n+1)/2$ distances.

After the pair-wise distances between feature vectors of the multimedia data within the cluster are calculated, a set of intra-cluster distance statistics can be calculated. The intra-cluster distance statistics may include: a minimal multimedia distance (e.g., d_min), maximal multimedia distance (e.g., d_max), and/or an average multimedia distance (e.g., d_ave). A standard deviation of the multimedia distances (e.g., d_std) may also be used as a statistic feature of the cluster. Furthermore, a normalized multimedia distance distribution may also be used as one of the statistics. To calculate a normalized multimedia distance distribution, all distances may be denoted by $d_i$ wherein $0 \leq i < n*(n+1)/2$ and the distances may be normalized to $d_i'=(d_i-d\_min\{d_i\})/(d\_max\{d_i\}-d\_min\{d_i\})$. The normalized distance calculation will result in a number between 0 and 1. Then, the normalized distance calculation (e.g., [0, 1]) may be divided into K bins (e.g., 10 bins, which is [0, 0.1), [0.1, 0.2), ... [0.9, 1]) and the number of normalized distances in each bin may be counted to form a histogram of normalized distances. The number in each bin may be divided by $n*(n+1)/2$ so that the sum of the numbers is equal to 1. The normalized histogram may represent the normalized multimedia distance distribution. Selected intra-cluster distance statistics (e.g., average distance, standard deviation, normalized histogram, etc.) may be converted into an intra-cluster feature vector.

The inter-cluster features represent relevance features of a cluster based on the distances between a cluster associated with a particular label of the set of labels and other clusters associated with other labels of the set of labels. The inter-cluster features may indicate a level of genericism or specificity of the cluster associated with the particular label when compared with clusters associated with the other labels of the set of labels. In other words, the inter-cluster features indicate a value used in determining how confusing or difficult multimedia data items represented by a particular label may be to identify. For example, if a topic has a set of labels include label A and label B, and if a cluster A1 that is associated with label A and a cluster B1 that is associated with label B are similar, label A and label B may be difficult and/or confusing to identify if A1 and B1 are both used as training data for modeling A and B, respectively. Accordingly, the inter-cluster features may be used to eliminate generic or common clusters from the corpus of multimedia data items.

To calculate the inter-cluster features, a distance between two clusters may be calculated. Cluster centroids may be used to represent the corresponding clusters. For example, if $C_0$ represents a particular cluster associated with a label ($L_0$) and other labels are represented by $L_1, L_2, \ldots L_{M-1}$, then the distance between $C_0$ and all of the clusters of $L_1, L_2, \ldots L_{M-1}$ may be calculated to determine the inter-cluster features.

In at least one embodiment, if the total number of distances is represented by M distances, then several statistics may be used to calculate the feature vector of the inter-cluster features. For example, distance may be calculated by determining a minimal multimedia distance (e.g., inter_d_min), maximal multimedia distance (e.g., inter_d_max), and/or an average multimedia distance (e.g., inter_d_ave). A standard deviation of the multimedia distances (e.g., inter_d_std) may also be used. Additionally or alternatively, a normalized multimedia distance distribution may also be calculated. To calculate a normalized multimedia distance distribution, distances may be denoted by $d_i$ wherein $0 \leq i < M$ and the distances may be normalized to $d_i'=(d_i-d\_min\{d_i\})/(d\_max\{d_i\}-d\_min\{d_i\})$. The normalized distance calculation will result in a number between 0 and 1. Then, the normalized distance calculation (e.g., [0, 1]) may be divided into K bins (e.g., 10 bins, which is [0, 0.1), [0.1, 0.2), ... [0.9, 1]) and the number of normalized distances in each bin may be counted to form a histogram of distances. The number in each bin may be divided by M to make the sum of the numbers equal to 1. The normalized histogram may represent the normalized multimedia distance distribution between clusters. Selected inter-cluster distance statistics (e.g., average distance, standard deviation, normalized histogram, etc.) may be converted into an inter-cluster feature vector.

In some embodiments, a weighted inter-cluster feature may be used to map a size of the cluster to a weight such that the size of the clusters may be utilized when computing inter-cluster features. A function ($f(x)$) may be used to map the size of a cluster to a weight. If a size of a cluster is represented as $C_1$ and $C_2$ and $S_1$ and $S_2$, then the weighted distance may be calculated as $d^w_{ij}=f(S_i)*f(S_j)*d(C_i,C_j)$. For example, if $f(x)$ is equal to 1, then the weighted distance may not be used. Another example of the function ($f(x)$) may include a square root.

The refining component 208 may be configured for removing multimedia data items from the corpus based in part on the intra-cluster and inter-cluster features. In some embodiments, the refining component 208 may remove multimedia data items from the corpus based in part on similarities between textual features as well. For example, tags or metadata associated with multimedia data items may be used to generate a similarity or distance value associated with the two multimedia data items associated with the tags or metadata. The similarity value may be calculated by counting the percentage of overlapped tags or by using language models to model the multimedia data items through the tags and then calculating the similarity value.

Following the removal of multimedia data items from the corpus, the remaining multimedia data items may be more relevant to the individual labels in the set of labels and/or have a higher quality than the multimedia data items of the pre-processed corpus. The resulting corpus may be a refined corpus used for training topic models to identify the label. The refining component 208 may remove multimedia data items based on the relevance score as determined by the intra-cluster features and inter-cluster features. In at least one embodiment, relevance scores for the refined corpus may differ depending on the intended use of the refined corpus. For example, in an embodiment where the multimedia data items in the refined corpus may be used for training topic models as described herein, a relevance score indicating that the data is relevant and of high quality may be preferred. However, in an embodiment where the multimedia data items in the refined corpus may be used for other processing, a relevance score indicating that the data is less relevant and/or of lower quality may be preferred.

In at least one embodiment, prior to training the topic models, the extraction component 204 may extract multimedia features from the multimedia data items in the refined corpus. Examples of multimedia features that may be extracted from the multimedia data items include bag-of-word features, fisher vector features, etc.

After extracting the multimedia features, clustering the multimedia data items, and refining the corpus, the learning component 210 may apply one or more learning algorithms to the refined corpus for learning to identify the one or more labels associated with the refined corpus of multimedia data items based on the extracted multimedia features. For example, learning algorithms such as fast rank, SVM, boosting, etc., may be applied to learn a model for identifying a particular label of the set of labels. The learning algorithms may be stored as models in the classifier component 212 and may be used to identify semantics in new multimedia data items. The set of models learned from the multimedia data items associated with the set of labels may be called the topic model, and the topic model may be stored in the classifier component 212.

In at least some embodiments, all labels may be learned at the same time using multi-label learning techniques, such as multiclass SVM. In other embodiments, the learning described above may be applied to new labels as new labels are received and the new models may be added to the classifier component 212.

The output module 120 may be configured to output results including labels identifying multimedia data items. In at least some embodiments, the output module 120 may output annotation information in addition to the labels identifying multimedia data items.

Example Processes

Figure 3:
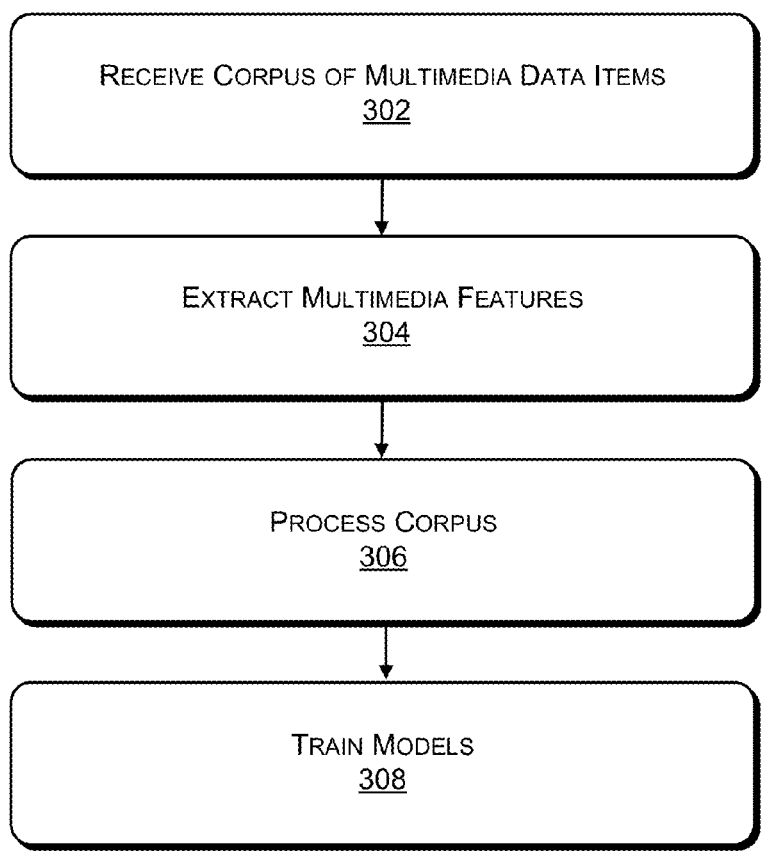
FIG. 3 illustrates a process for learning topic models from multimedia data items.
Figure 4:
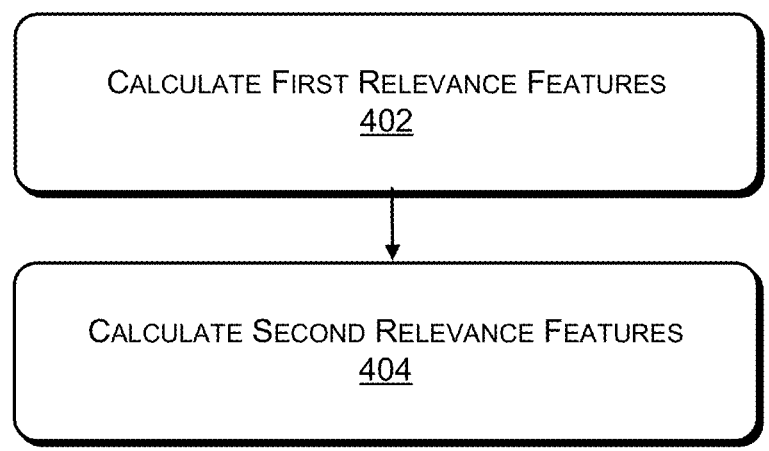
FIG. 4 illustrates a process for refining a collection of multimedia data items.
Figure 5:
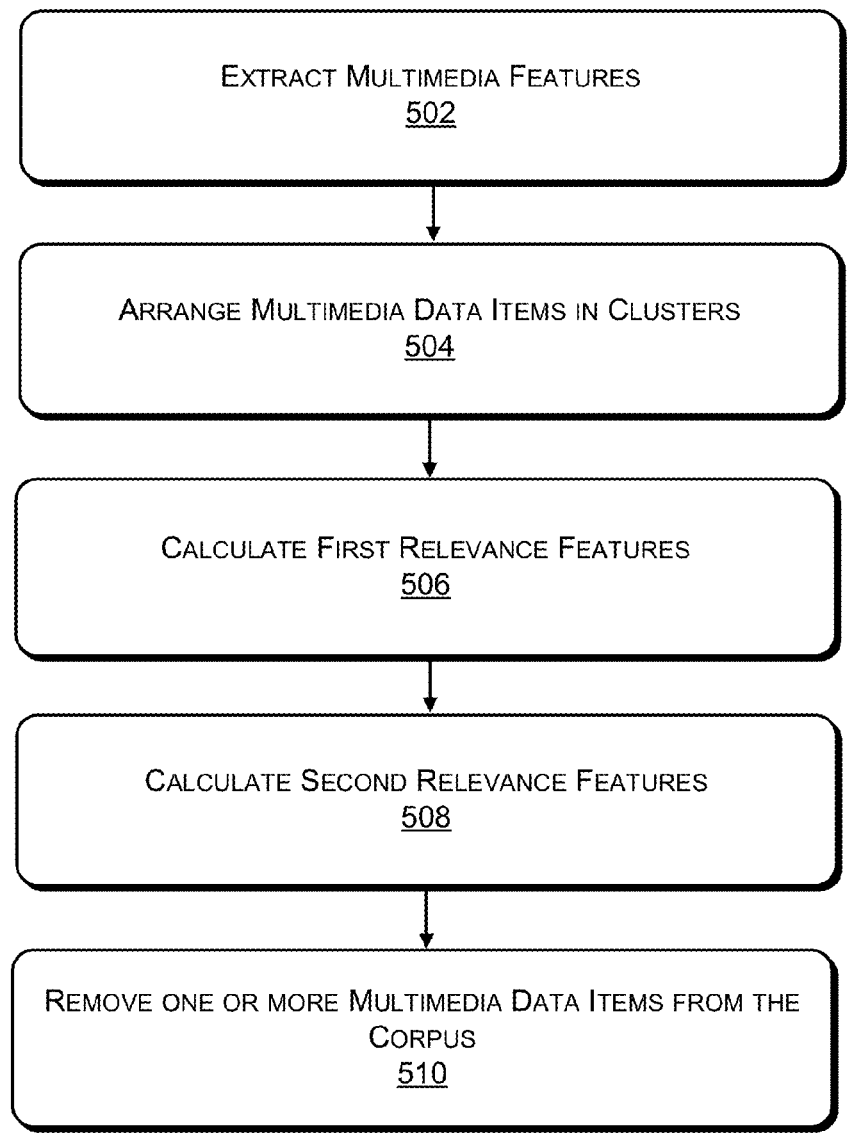
FIG. 5 illustrates a process for refining a collection of multimedia data items.

FIGS. 3-5 describe example processes for learning topic models from unstructured data. The example processes are described in the context of the environment of FIGS. 1 and 2 but are not limited to those environments. The processes are illustrated as logical flow graphs, each operation of which represents an operation in the illustrated or another sequence of operations that may be implemented in hardware, software, or a combination thereof. In the context of software, the operations represent computer-executable instructions stored on one or more computer-readable media 114 that, when executed by one or more processors 112, configure a computing device to perform the recited operations. Generally, computer-executable instructions include routines, programs, objects, components, data structures, and the like that configure a computing device to perform particular functions or implement particular abstract data types.

The computer-readable media 114 may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions, as described above. Finally, the order in which the operations are described is not intended to be construed as a limitation, and any number of the described operations may be combined in any order and/or in parallel to implement the process.

FIG. 3 illustrates a process 300 for learning topic models from unstructured data.

Block 302 illustrates receiving a corpus of multimedia data items. As described above, the receiving component 202 may send one or more queries associated with individual labels in a set of labels to one or more search engines, social-networking services, blogging services, and/or other websites or web services. Multimedia data items relating to the one or more queries and associated with the individual labels may be returned to the receiving component 202 from the one or more search engines, social-networking services, blogging services, and/or other websites or web services. As described above, this may be repeated for each of the individual labels in the set of labels and the corpus of multimedia data items may comprise the multimedia data items returned from the queries associated with each of the individual labels in the set of labels.

Block 304 illustrates extracting multimedia features. As described above, the corpus of multimedia data items may be noisy and may include multimedia data items that are unrelated to the set of labels, are of low quality, etc. Accordingly, the extraction component 204 may be configured for extracting multimedia features from the multimedia data items to be used in processing the corpus. Multimedia features may include visual features and textual features.

Block 306 illustrates processing the corpus. As described above, the clustering component 206 may be configured for arranging the multimedia data items in clusters based on similarities between visual features and textual features of the extracted multimedia features. In at least one embodiment, the clusters of multimedia data items are processed to derive sets of relevance features for each cluster to differentiate relevant clusters having high quality multimedia data items from clusters that are irrelevant and/or have low quality multimedia data items. The sets of relevance features may include intra-cluster features and inter-cluster features.

Block 308 illustrates training models. As described above, after extracting the multimedia features, clustering the multimedia data items, and refining the corpus, the learning component 210 may apply learning algorithms to the refined corpus for learning to identify the individual labels based on the extracted multimedia features.

FIG. 4 illustrates a process 400 for refining a collection of multimedia data items.

Block 402 illustrates calculating first relevance features. As described above, at least two relevance features or sets of features may be used for processing and refining the corpus of multimedia data items. Intra-cluster features may represent one of the relevance features or sets of features. The intra-cluster features represent distance distribution characteristics of pairs of multimedia data items within a cluster of multimedia data items associated with a label. Examples of cluster characteristics include consistency between the multimedia data items in the cluster, quality of the multimedia data items in the cluster, etc. The intra-cluster features may be determined by calculating multimedia distances for multimedia data item pairs in the cluster as described above.

Block 404 illustrates calculating second relevance features. Inter-cluster features may represent another one of the relevance features or sets of features. The inter-cluster features represent distance distribution characteristics between a cluster associated with the label and other clusters associated with other labels. The inter-cluster features may indicate a level of genericism or specificity of the label when compared with other labels associated with the same topic. To calculate the inter-cluster features, a distance between two clusters associated with different labels may be calculated as described above.

The intra-cluster features and inter-cluster features may be used for refining the corpus to create a refined corpus. The refined corpus may be used for training models via learning algorithms as described above.

FIG. 5 illustrates a process 500 for refining a collection of multimedia data items.

Block 502 illustrates extracting multimedia features. As described above, multimedia data items relating to the one or more queries and associated with individual labels of a set of labels may be returned to the receiving component 202 from the one or more search engines, social-networking services, blogging services, and/or other websites or web services. The collection of multimedia data items may comprise a corpus. The corpus of multimedia data items may be noisy and may include multimedia data items that are unrelated to the set of labels, are of low quality, etc. Accordingly, the extraction component 204 may be configured for extracting multimedia features from the multimedia data items to be used in processing the corpus Block 504 illustrates arranging multimedia data items in clusters. As described above, the clustering component 206 may be configured for arranging the multimedia data items in clusters based on similarities between visual features and text features of the extracted multimedia features. In at least one embodiment, the clusters of multimedia data items are processed to derive sets of features for each cluster to differentiate relevant clusters having high quality multimedia data items from clusters that are irrelevant and/or have low quality multimedia data items.

Block 506 illustrates calculating first relevance features. As described above, at least two relevance features or sets of features may be used for processing and refining the corpus of multimedia data items. Intra-cluster features may represent one of the relevance features or sets of features. The intra-cluster features may be determined by calculating multimedia distances for multimedia data item pairs in the cluster as described above.

Block 508 illustrates calculating second relevance features. Inter-cluster features may represent another one of the relevance features or sets of features. The inter-cluster features represent distance distribution characteristics between a cluster associated with the label and other clusters associated with other labels. To calculate the inter-cluster features, a distance between two clusters associated with different labels may be calculated as described above.

Block 510 illustrates removing one or more multimedia data items from the corpus. As described above, the refining component 208 may be configured for removing multimedia data items from the corpus based in part on the intra-cluster and inter-cluster features. As a result, the remaining multimedia data items may be more relevant to the set of labels and/or have a higher quality than the multimedia data items of the pre-processed corpus. The resulting corpus may be a refined corpus used for training models to identify individual labels in the set of labels.

As described above, the learning processes may be applied to new labels as new labels are received and the new models that may result may be added to the classifier component 212. Additionally, the resulting models may be added into existing data-mining systems.

Applying the Learned Models

Figure 6:
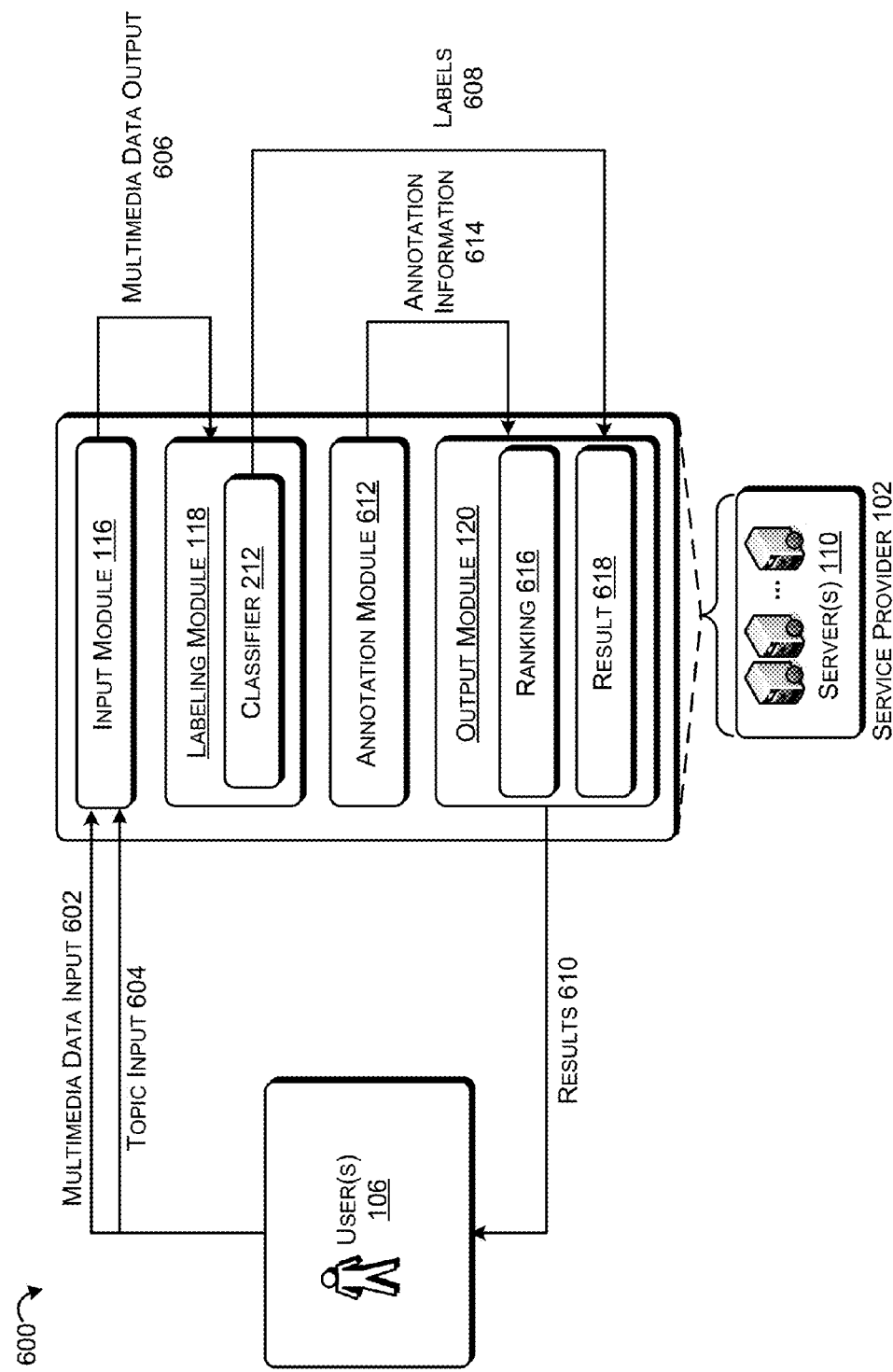
FIG. 6 illustrates a diagram showing an example system for applying learned topic models to recognize semantics for new data items.

FIG. 6 illustrates a diagram showing an example system for applying learned semantic mining models to recognize semantics for new data items. As shown in FIG. 6, the system 600 may include the input module 116, the labeling module 118, and the output module 120.

The input module 116 may be configured to receive inputs from one or more users 106. As described above, users 106 may input one or more multimedia data items as multimedia data inputs 602 into the input module 116 via one of the user devices 108. The multimedia data inputs 602 may include one or more regions of interest. For example, a multimedia data input 602 may include multiple animals (e.g., a lion and a tiger) or multiple attractions (e.g., the Space Needle and the Experience Music Project Museum).

In addition to receiving multimedia data input 602, the input module 116 may receive topic input 604 from the one or more users 106 indicating a topic associated with the multimedia data item. For example, if the multimedia data input 602 includes objects the user 106 knows to be animals, the user 106 may select "Animals" as the topic input 604. Alternatively, if the multimedia data input 602 is of an attraction the user 106 knows to be in Seattle, the user 106 may select "Seattle Attractions" as the topic input 604.

The input module 116 also may be configured to send multimedia data output 606 to the labeling module 118. As described above, the labeling module 118 may include a classifier component 212. The labeling module 118 may be configured to apply the one or more models associated with the corresponding topic model stored in the classifier component 212 to determine one or more labels 608 associated with the multimedia data input 602. The labeling module 118 may provide the one or more labels 608 to the output module 120 to be incorporated into a result 610.

An annotation module 612 may be configured to collect information about the multimedia data output 606 from sources outside of system 600. In at least one embodiment, the annotation module 612 may query one or more search engines, sharing sites, and/or websites with annotation queries including the one or more labels 608 associated with the multimedia data input 602. The annotation module 612 may receive annotation information 614 associated with the annotation query and may present the annotation information 614 to the output module 120. The output module 120 may incorporate the annotation information 614 into the result 610.

The output module 120 may include a ranking component 616 and a result component 618. Ranking component 616 may be configured to rank the classification labels 608 based on a confidence score generated and outputted by the classifier component 212. The result component 618 may be configured to receive and organize the one or more labels 608 and annotation information 614 for presentation as a result 610 to a user 106. In an embodiment where the multimedia data input 602 includes two or more regions of interest, the result 610 may identify each region of interest. For example, if the multimedia data input 602 includes a lion and a tiger, the result 610 may also identify the lion and the tiger. In such embodiment, the result 610 may also include annotation information 614 about the lion and the tiger.

Example Processes

Figure 7:
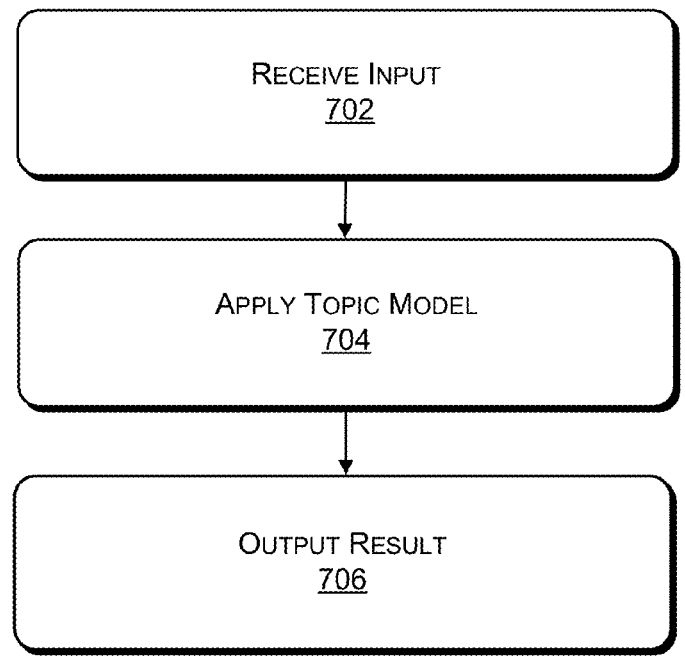
FIG. 7 illustrates a process for recognizing semantics for a new data item.
Figure 8:
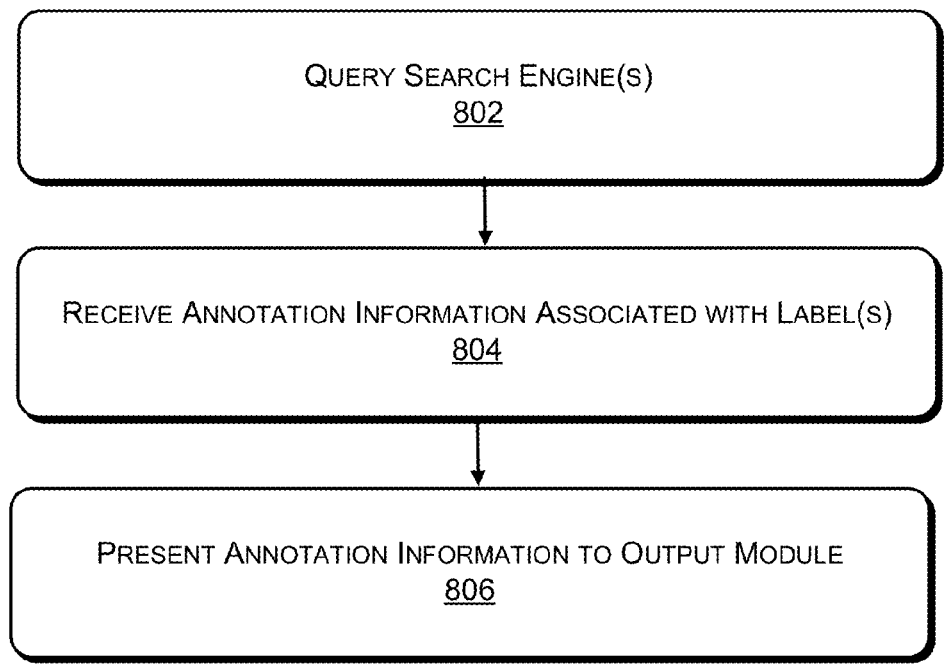
FIG. 8 illustrates a process for accessing annotation information.

FIGS. 7-8 describe example processes for applying learned topic models to recognize semantics for new data items. The example processes are described in the context of the environment of FIGS. 1, 2, and 6 but are not limited to those environments. The processes are illustrated as logical flow graphs, each operation of which represents an operation in the illustrated or another sequence of operations that may be implemented in hardware, software, or a combination thereof. In the context of software, the operations represent computer-executable instructions stored on one or more computer-readable media 114 that, when executed by one or more processors 112, configure a computing device to perform the recited operations. Generally, computer-executable instructions include routines, programs, objects, components, data structures, and the like that configure a computing device to perform particular functions or implement particular abstract data types.

The computer-readable media 114 may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions, as described above. Finally, the order in which the operations are described is not intended to be construed as a limitation, and any number of the described operations may be combined in any order and/or in parallel to implement the process.

FIG. 7 illustrates a process 700 for recognizing semantics for a new data item.

Block 702 illustrates receiving input. As described above, users 106 may input one or more multimedia data items as multimedia data inputs 602 into the input module 116 via one of the user devices 108. The multimedia data inputs 602 may include one or more regions of interest. In addition to receiving multimedia data input 602, the input module 116 may receive topic input 604 from the one or more users 106 indicating a topic associated with the multimedia data input.

Block 704 illustrates applying a topic model. As described above, the labeling module 118 may be configured to apply one or more models associated with the corresponding topic model and stored in the classifier component 212 to determine a one or more labels 608 associated with the multimedia data input. The labeling module 118 may provide the one or more labels 608 to the output module 120 to be incorporated into a result 610.

Block 706 illustrates outputting a result 610. As described above, the result component 618 may be configured to receive and organize the one or more labels 608 for presentation as a result 610 to a user 106. The result 610 may include the one or more labels 608 identified in the labeling module 118 and, in some embodiments, annotation information 614.

FIG. 8 illustrates a process 800 for accessing annotation information 614 to be incorporated into a result 610. As described above, the annotation module 612 may be configured to collect information about the multimedia data output 606 from sources outside of system 600.

Block 802 illustrates querying one or more search engines. As described above, the annotation module 612 may query one or more search engines, sharing sites, and/or websites with annotation queries including the one or more labels 608 associated with the multimedia data input 602.

Block 804 illustrates receiving annotation information 614 associated with the one or more labels 608.

Block 806 illustrates presenting annotation information 614 to the output module. The output module 120 may incorporate the annotation information 614 into the result 610.

CONCLUSION

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "may," unless specifically stated otherwise, are understood within the context to present that certain embodiments include, while other embodiments do not necessarily include, certain features, elements and/or steps. Thus, such conditional language is not generally intended to imply that certain features, elements and/or steps are in any way required for one or more embodiments or that one or more embodiments necessarily include logic for deciding, with or without user input or prompting, whether certain features, elements and/or steps are included or are to be performed in any particular embodiment. Conjunctive language such as the phrase "at least one of X, Y or Z," unless specifically stated otherwise, is to be understood to present that an item, term, etc. may be either X, Y, or Z, or a combination thereof.

The invention claimed is:

1. A method comprising:
    extracting, by at least one or more computing devices, visual features from images of a corpus of images;
    arranging, by the at least one or more computing devices, the images in clusters based at least in part on similarities of the visual features;
    calculating, by the at least one or more computing devices, at least two relevance features, including:
    first relevance features representing distribution characteristics of distances between pairs of images in a same cluster; and
    second relevance features representing distribution characteristics of distances between different clusters of images; and
    refining, by the at least one or more computing devices, the corpus by removing one or more images from the corpus based in part on the at least two relevance features to create a refined corpus.

2. A method as claim 1 recites wherein a first cluster of the different clusters is associated with a first label and a second cluster of the different clusters is associated with a second label.

3. A method as claim 1 recites, further comprising:
    processing the refined corpus by applying one or more learning algorithms to the refined corpus; and
    creating one or more models associated with a topic for identifying an image.

4. A method as claim 1 recites, wherein the visual features include at least one of edges, corners, or objects.

5. A method as claim 1 recites, further comprising:
    extracting textual features from textual data associated with the images; and
    arranging the images in the clusters based at least in part on similarities of the visual features and the textual features.

6. A method comprising:
    receiving, by at least one or more computing devices, a corpus of images associated with a set of labels;
    extracting, by the at least one or more computing devices, visual features from the images;
    arranging, by the at least one or more computing devices, the images into a plurality of clusters based at least in part on similarities of the visual features;
    determining, by the at least one or more computing devices, at least two relevance features associated with individual clusters of the plurality of clusters, wherein:
    first relevance features of the at least two relevance features are based on pairs of images in a first cluster of the plurality of clusters;
    the first cluster is associated with a first label of the set of labels; and
    second relevance features of the at least two relevance features are based on the first cluster and at least one second cluster associated with a second label of the set of labels;
    processing, by the at least one or more computing devices, the corpus of images to generate a refined corpus of images associated with the set of labels based in part on the at least two relevance features; and
    training, by the at least one or more computing devices, a set of models for identifying individual labels of the set of labels based at least in part on the extracted visual features.

7. A method as claim 6 recites wherein the processing further comprises removing images from the corpus based in part on the at least two relevance features.

8. A method as claim 7 recites wherein the first relevance features represent distribution characteristics of distances between the pairs of images in the first cluster.

9. A method as claim 7 recites wherein the second relevance features represent distribution characteristics of distances between the first cluster and a plurality of second clusters associated with the second label.

10. A method as claim 6 recites wherein the receiving the corpus of images comprises receiving individual images from at least one of one or more search engines, sharing sites, or websites.

11. A method as claim 6 recites, further comprising receiving textual queries corresponding to individual labels of the set of labels, wherein the individual labels represent a semantic meaning associated with individual images of the corpus of images.

12. A method as claim 11 recites, further comprising, prior to receiving the textual queries:
  receiving a topic query identifying a topic;
  sending the topic query to at least one of one or more search engines, sharing sites, knowledge databases, or websites;
  responsive to sending the topic query, receiving a set of labels associated with the topic; and
  identifying the textual queries from the set of labels.

13. A method as claim 6 recites, further comprising:
  receiving a new textual query identifying a new label;
  receiving a new corpus of images associated with the new label;
  extracting new visual features from the new corpus of images;
  training a new model for identifying the new label based at least in part on the new visual features; and
  storing the new model for identifying the new label with a set of previously stored models.

14. A system comprising:
  memory;
  one or more processors; and
  one or more modules stored in the memory and executable by the one or more processors, the one or more modules including:
  a labeling module configured to learn a topic model associated with one or more based at least in part on:
  extracting visual features from a corpus of images associated with the one or more labels; and
  processing the corpus of images based in part on at least two relevance features:
    first relevance features of the at least two relevance features representing distribution characteristics of distances between pairs of images in a same cluster; and
    second relevance features of the at least two relevance features representing distribution characteristics of distances between different clusters of images.

15. A system as claim 14 recites, wherein the one or more modules further include:
  an input module configured to receive an input including an image; and
  an output module configured to output one or more results based on applying the topic model to the image, the one or more results including at least one label of the one or more labels identifying the image.

16. A system s claim 15 recites wherein the input further includes a topic associated with the image.

17. A system as claim 15 recites wherein the output module is further configured to rank the one or more labels identifying the image based at least in part on a confidence score.

18. A system as claim 15 recites, further comprising an annotation module configured to:
  query one or more search engines, sharing sites, or websites, wherein individual queries include individual labels of the one or more labels identifying the image;
  receive annotation information associated with the one or more labels identifying the image; and
  present the annotation information associated with the one or more labels identifying the image to the output module.

19. A system as claim 18 recites, wherein the output module is further configured to output the annotation information with the one or more labels identifying the image.

20. A system as claim 15 recites, wherein:
  the image is associated with two or more regions of interest;
  the labeling module is further configured to apply the topic model to determine two or more labels associated with the two or more regions of interest; and
  the output module is further configured to output the two or more labels identifying the two or more regions of interest.

* * * * *